US012798640B2

(12) United States Patent
Carrier

(10) Patent No.: US 12,798,640 B2
(45) Date of Patent: Nov. 17, 2026

(54) COMBINATION MANUAL HAND TRUCK AND ELECTRIC MOVER

(71) Applicant: Thomas S. Carrier, Byron, GA (US)

(72) Inventor: Thomas S. Carrier, Byron, GA (US)

( * ) Notice: Subject to any disclaimer, the term of this patent is extended or adjusted under 35 U.S.C. 154(b) by 725 days.

(21) Appl. No.: 18/207,593

(22) Filed: Jun. 8, 2023

(65) Prior Publication Data

US 2024/0140509 A1 May 2, 2024

Related U.S. Application Data

(60) Provisional application No. 63/421,714, filed on Nov. 2, 2022.

(51) Int. Cl.

*B62B 1/00* (2006.01)
*B62B 1/12* (2006.01)
*B62B 1/14* (2006.01)
*B62B 5/00* (2006.01)

(52) U.S. Cl.

CPC ................ *B62B 1/002* (2013.01); *B62B 1/14* (2013.01); *B62B 5/0033* (2013.01); *B62B 5/0069* (2013.01); *B62B 1/12* (2013.01); *B62B 5/0046* (2013.01); *B62B 5/0053* (2013.01); *B62B 2203/26* (2013.01); *B62B 2301/04* (2013.01)

(58) Field of Classification Search

CPC ... B62B 5/0036; B62B 5/0053; B62B 5/0033; B62B 5/004; B62B 5/0043; B62B 5/0046; B62B 5/005; B62B 1/002; B62B 1/186; B62B 1/12

See application file for complete search history.

(56) References Cited

U.S. PATENT DOCUMENTS

| | | | | |
|---|---|---|---|---|
| 2,814,402 A * | 11/1957 | Schaefer | B62B 1/14 | 206/322 |
| 7,104,555 B1 * | 9/2006 | Davis | B62B 3/02 | 280/47.28 |
| 8,100,430 B2 * | 1/2012 | Meyers | B62B 1/12 | 280/30 |
| 8,651,500 B2 * | 2/2014 | Mitchell | B62B 3/0606 | 280/47.27 |
| 9,321,471 B1 * | 4/2016 | Gedeon-Janvier | B62B 3/02 | |
| 9,415,789 B2 * | 8/2016 | Sommers | B62B 1/042 | |
| 9,616,907 B1 | 4/2017 | Gibson | | |

(Continued)

*Primary Examiner* — Emma K Frick

(74) *Attorney, Agent, or Firm* — J.T. Rollin Attorneyat Law P.C

(57) ABSTRACT

The inventive concept relates to a manually operated hand truck that can also be electrically powered, the apparatus referred to as an “electric mover.” The electric mover includes a main frame comprising handle bars, upper and lower load stabilizers, and a load plate connected to the main frame. In powered operation, a pair of co-axial drive wheels, positioned at the lower extremity of the main frame, is driven by a transaxle. The transaxle receives power through a control box containing a pair of replaceable batteries. The electric mover is further constructed with a positionable leg assembly comprising two moveable legs, each having a bottommost caster wheel. The moveable legs may be pivotally arranged at either an extended working position, or a stowed position against the frame, which provides an alternative load bearing configuration. Additional components include a customized fork extensions assembly and a rolling wheel attachment.

12 Claims, 12 Drawing Sheets

(56) References Cited

U.S. PATENT DOCUMENTS

Figure 1:
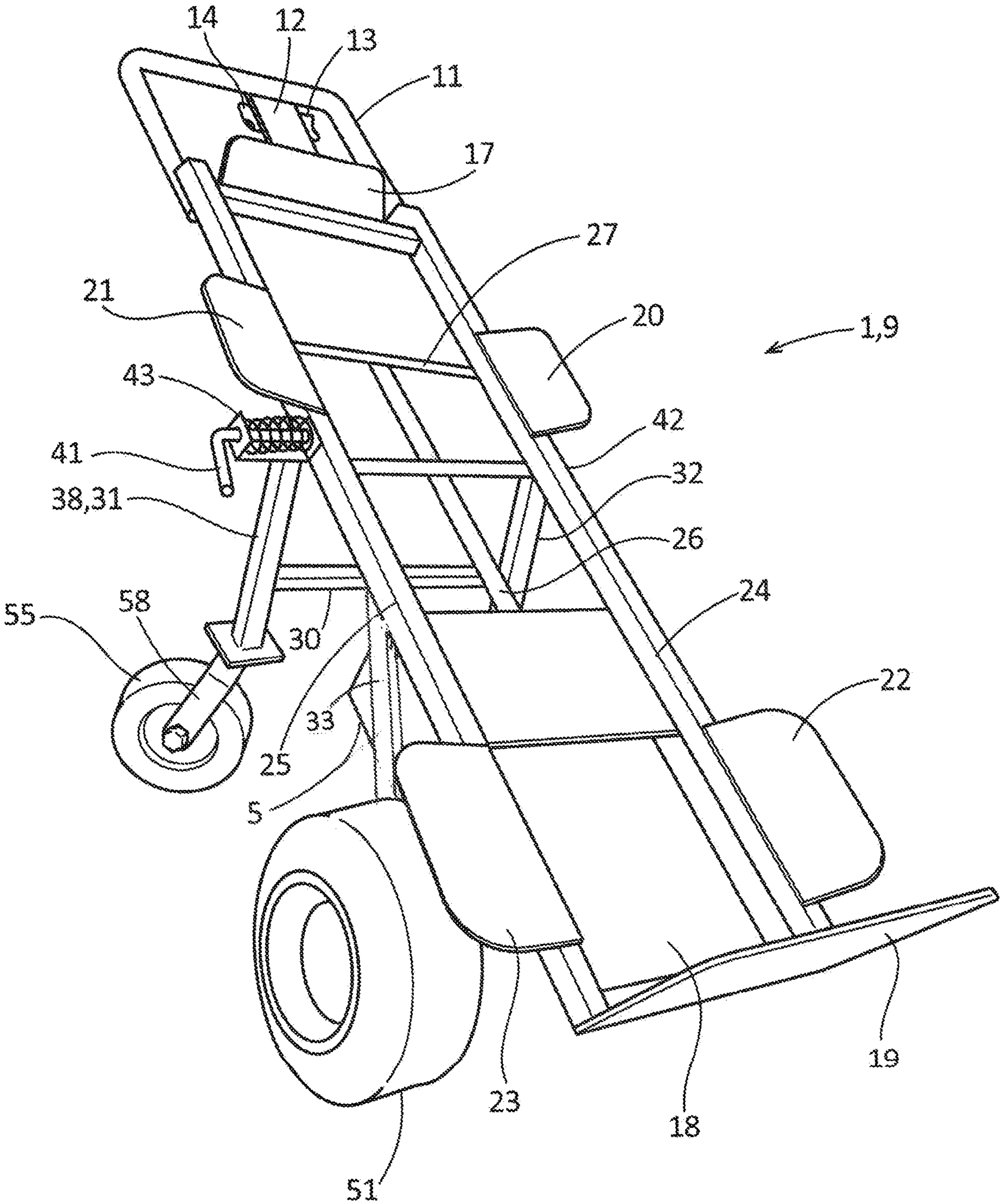

| | | | | |
|---|---|---|---|---|
| 9,643,631 | B2 * | 5/2017 | Berlinger | B62B 1/12 |
| 9,663,130 | B2 | 5/2017 | Powwarynn | |
| 9,688,298 | B1 | 6/2017 | Su | |
| 9,776,650 | B1 | 10/2017 | Berlinger | |
| 9,969,411 | B2 | 5/2018 | Belotti et al. | |
| 10,703,397 | B1 | 7/2020 | Mendoza | |
| 10,793,173 | B2 * | 10/2020 | Kalinowski | B62B 3/04 |
| 12,122,441 | B2 * | 10/2024 | An | B62B 1/002 |
| 2007/0289787 | A1 * | 12/2007 | Wiff | B62B 5/0026 180/16 |
| 2010/0327544 | A1 * | 12/2010 | Pebworth | B62B 1/14 280/6.151 |
| 2015/0203137 | A1 * | 7/2015 | Lang | B62B 3/04 414/469 |
| 2016/0264166 | A1 | 9/2016 | Miller | |
| 2018/0072337 | A1 * | 3/2018 | Strayhorn | B62B 5/0083 |
| 2019/0047601 | A1 * | 2/2019 | Murphy | B62B 1/18 |
| 2020/0369306 | A1 * | 11/2020 | West, Jr. | B62B 1/002 |
| 2021/0316772 | A1 | 10/2021 | Burton et al. | |
| 2023/0093085 | A1 * | 3/2023 | Djerassi, Sr. | B62B 1/208 |

* cited by examiner

COMBINATION MANUAL HAND TRUCK AND ELECTRIC MOVER

CROSS-REFERENCES TO RELATED APPLICATIONS

This patent application claims the benefit of priority from previously-filed U.S. provisional patent application, Ser. No. 63/421,714, filed on Nov. 2, 2022, and further claims the benefit and content of provisional patent application No. 63/421,714, as though fully appearing herein.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION

(1) Field of the Invention

The field of the present inventive concept relates to hand trucks that be operated manually or by electrical power. More specifically, the current disclosures present a mechanical/electric hand truck with improved functional capabilities and components for performing a variety of industrial tasks.

(2) Description of the Related Art, Including Information Disclosed Under 37 CFR 1.97 and 1.98

U.S. Pat. No. 9,969,411 B2; Berlotti, J; May 15, 2018. A hand truck includes a frame, a toe plate connected to the frame, a pair of wheels rotatably secured to the frame, and a handle connected to the frame. A fourth-wheel attachment is pivotally connected to the frame at a first point and removable connected to the frame at a second point. A lever positioned adjacent to the handle causes the removable connection between the fourth-wheel attachment and the frame to be released, allowing the fourth-wheel assembly to pivot away from the frame. An embodiment of a hand truck includes a break back bar. The break back bar is pivotable with respect to the frame. The break back bar may be deployed and stood on by a user to prevent movement of the hand truck while pivoting a load.

U.S. Published Patent Application No. 2021/0316772 A1; Burton, et al; Oct. 14, 2021 A powered lift hand truck with a corresponding method of operation and control. The apparatus includes a powered lift hand truck configured to lift a load from a lowered to a raised position (and vice versa). The system uses the rotational speed to measure linear speed and enforce a consistent speed of the load. The system is programmed to lift/lower loads at the same speed, regardless of load overall weight. If, for example, the load is heavy, the system determines that the speed is below a predetermined threshold and increases the power so as to increase speed.

U.S. Pat. No. 9,616,907 B1; Gibson, W; Apr. 11, 2017; A hand truck is convertible to assume an expanded use mode and a flat storage mode. The hand truck includes a rolling base and a base pusher. The rolling base is arranged to support goods and to roll on ground underlying the hand truck. The base pusher is mounted on the rolling base for pivotable movement about a base-pusher pivot axis from an upright hand-truck position to a storage position to rearrange the hand truck between the expanded use mode and the flat storage mode.

U.S. Pat. No. 10,703,397 B1; Mendoza, J.; Jul. 7, 2020; A hand truck that includes frame assembly, wheels and a toe plate assembly. The frame assembly includes two side members and a base member extending between the lower ends of the side members. The toe plate assembly is rotatably mounted to the frame so that the toe plate is able to rotate between an operating position in which the toe portion extends forward for sliding under and lifting loads and the toe plate rests against the base member of the frame and a storage position in which the toe plate rests upon the wheel axle and an intermediate shipping position such that when the wheels are removed the hand truck may fit into a box having a minimum depth.

U.S. Published Patent Application No. 2016/0264166 A1; Miller, M.; Sep. 15, 2016

A portable hand truck is disclosed having a collapsible frame, the frame being movable between collapsed, storage mode and an expanded, upright mode. The hand truck has wheels disposed at a lower end of the frame, a folding support platform hingedly or rotatably connected to a lower end of the frame, and having a battery, a drive controller, and at least one motor. The motor is mechanically connected to at least one wheel or to an axle of the hand truck, and the motor is electrically connected to the battery and the drive controller. The motor and battery are positioned on a lower part of the frame of the hand truck, proximate the wheels to provide a more compact area for collapsing the frame, as well as to provide a lower center of gravity for the hand truck, thereby making the hand truck more stable.

U.S. Pat. No. 9,663,130 B2; Powwarynn, T. May 30, 2017

A hand truck is provided, comprising a frame, a pair of back wheels secured to a first edge of the frame, a nose plate hingedly secured to the first edge of the frame, a telescopic handle hingedly secured to a second edge of the frame opposite the first edge, and a motorized wheel assembly separately connected to the second edge of the frame and to the handle. The hand truck has three configurations: a hand truck configuration whereby the nose plate is in a horizontal position, the frame is in a vertical position, and the handle is extended vertically; a storage configuration whereby the nose plate is in a vertical position, the frame is in a vertical position, and the handle is retracted; and a scooter configuration whereby the nose plate is in a horizontal position, the frame is in a horizontal position, and the handle is extended.

BRIEF SUMMARY OF THE INVENTION

The inventive concept disclosed generally relates to a manually operated hand truck that can also be electrically powered, the apparatus referred to as an "electric mover" 1. The electric mover 1 includes a main frame 9 comprising handle bars 11, upper and lower load stabilizers 20, 21, 22, 23, upper and lower protection plates 17, 18, and a load plate 19 connected to the main frame 9. A lower support structure 16 is also an integral part of the main frame 9. When in powered operation, a pair of co-axial drive wheels 50, 51, are driven by a transaxle 60, which transaxle 60 receives electrical power from a set of dual, replaceable batteries 7, 8.

The basic electric mover 1 also is constructed with a positionable leg assembly 38 comprising two moveable legs 31, 32, each of said movable legs 31, 32 connected to a respective caster wheel 54, 55. The positionable leg assembly 38 may be pivotally positioned at variable angular relationships to the frame 9, thereby allowing additional structural support for oversized and/or weighty cargo placed on the electric mover 1.

In other embodiments, the electric mover 1 also operates with two auxiliary co-axial wheels 75, 76, referred to as a "rolling attachment 70, attached proximate the load plate 19 of the electric mover 1.

Figure 9:
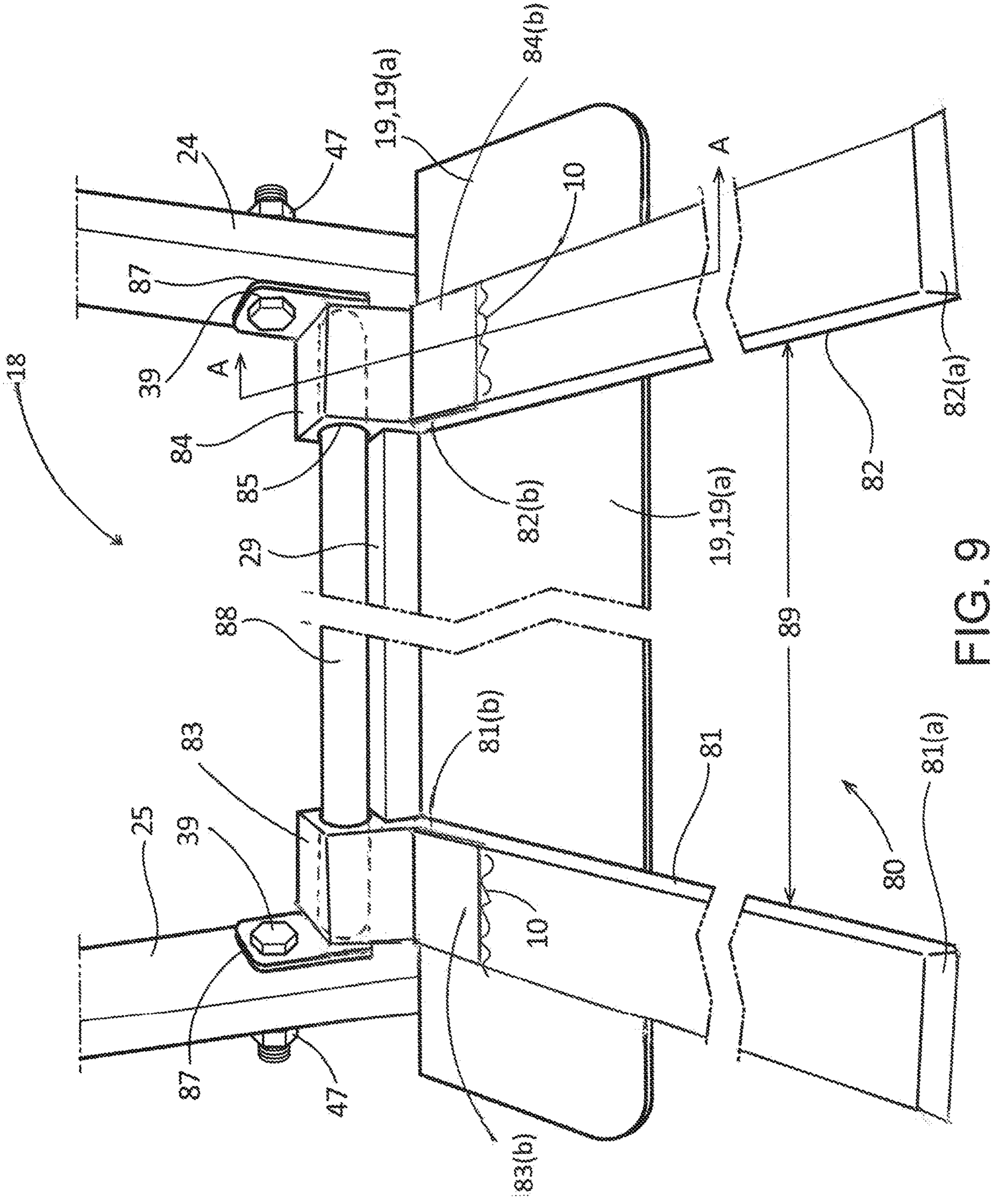
Figure 10:
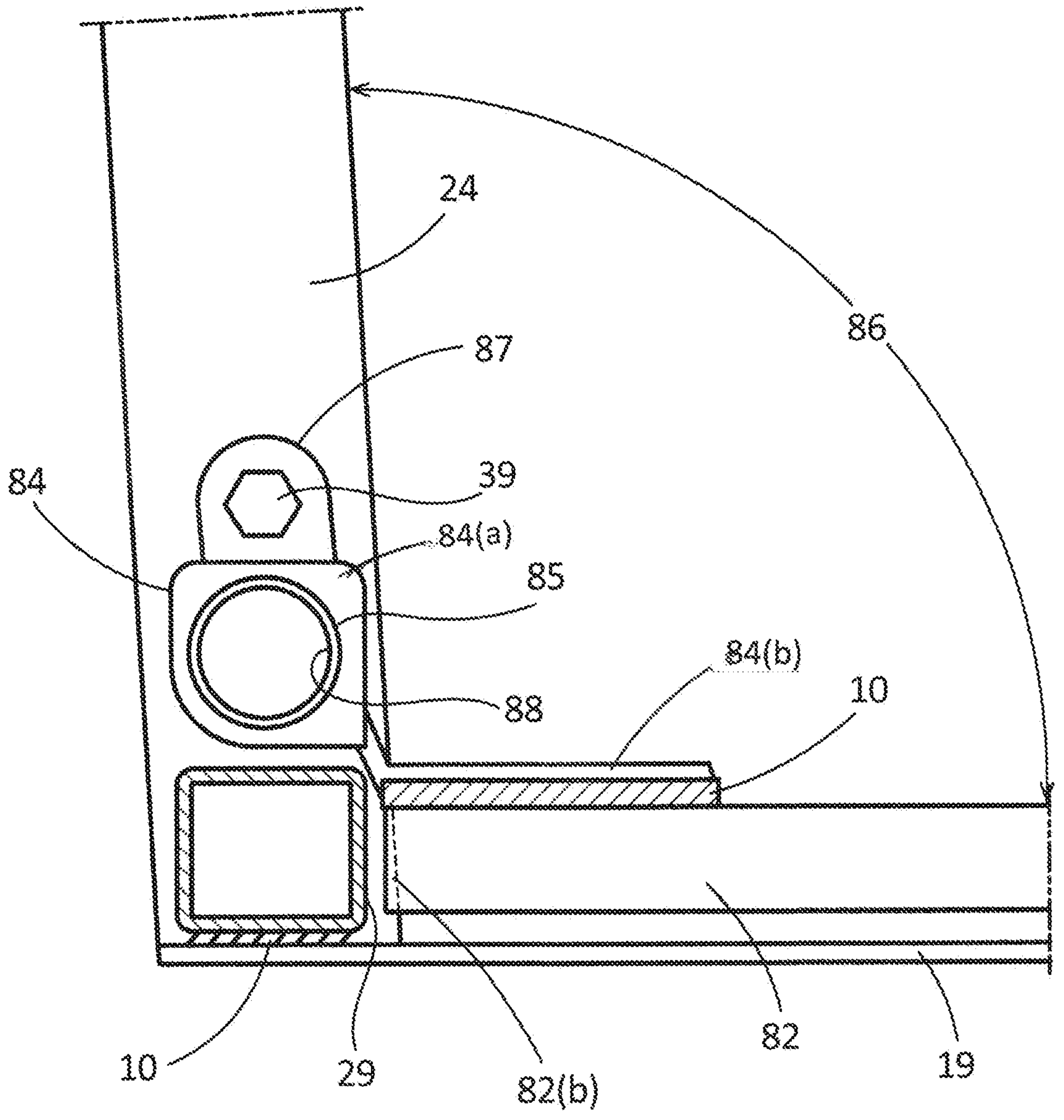

An additional mode of operation of the electric mover 1 is the use of a fork extensions assembly 80 consisting of a planar right extension 81, and a parallel, planar left extension 82, each extension 81, 82 affixed about the exterior surface of a common hollow, tubular cylinder 88. Both the right and left extension 81, 82, respectively, rotate in a pivoting manner about the tubular cylinder 88, as shown in FIG. 9 and FIG. 10. In this manner, the electric mover 1 functions in the manner of a manual fork lift.

Other embodiments provide for the attachment of (1) a trailer hitch mechanism and also, (2) a cable for performing towing operations. The electric mover 1 and transaxle 60 may then be utilized to function as a motorized tug for pulling wheeled vehicles or other towable objects. The electric mover 1 also is functional when coupled with a cage-type container affixed to the frontal surfaces of the frame 9 of the electric mover 1.

BRIEF DESCRIPTION OF THE VIEWS OF DRAWINGS AS EXEMPLARY EMBODIMENTS OF THE INVENTIVE CONCEPT

FIG. 1 is a perspective view of the electric mover 1 apparatus, its right-side main drive tire 51, upper and lower load stabilizers 20, 21, 22, 23, and a partial view of the positionable leg assembly 38, in its operational position.

Figure 2:
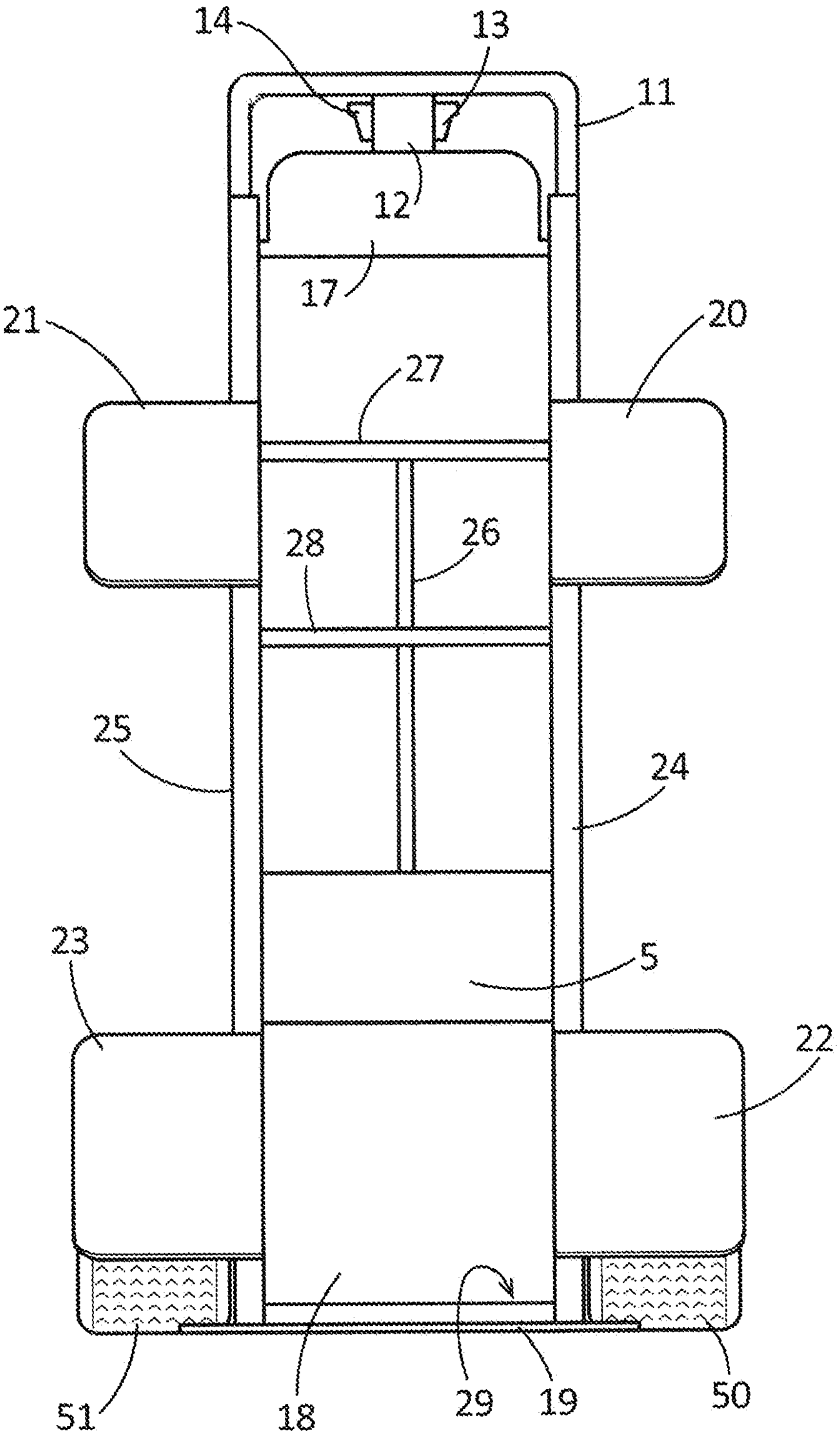

FIG. 2 shows a direct frontal view of the electric mover 1, including components of the main frame 9, the left vertical rail 24, right vertical rail 25, center load brace bar 26, upper load brace bar 27, lower load brace bar 28, upper and lower load stabilizers, 20, 21, 22, 23 and the left and right drive tires 50, 51.

Figure 3:
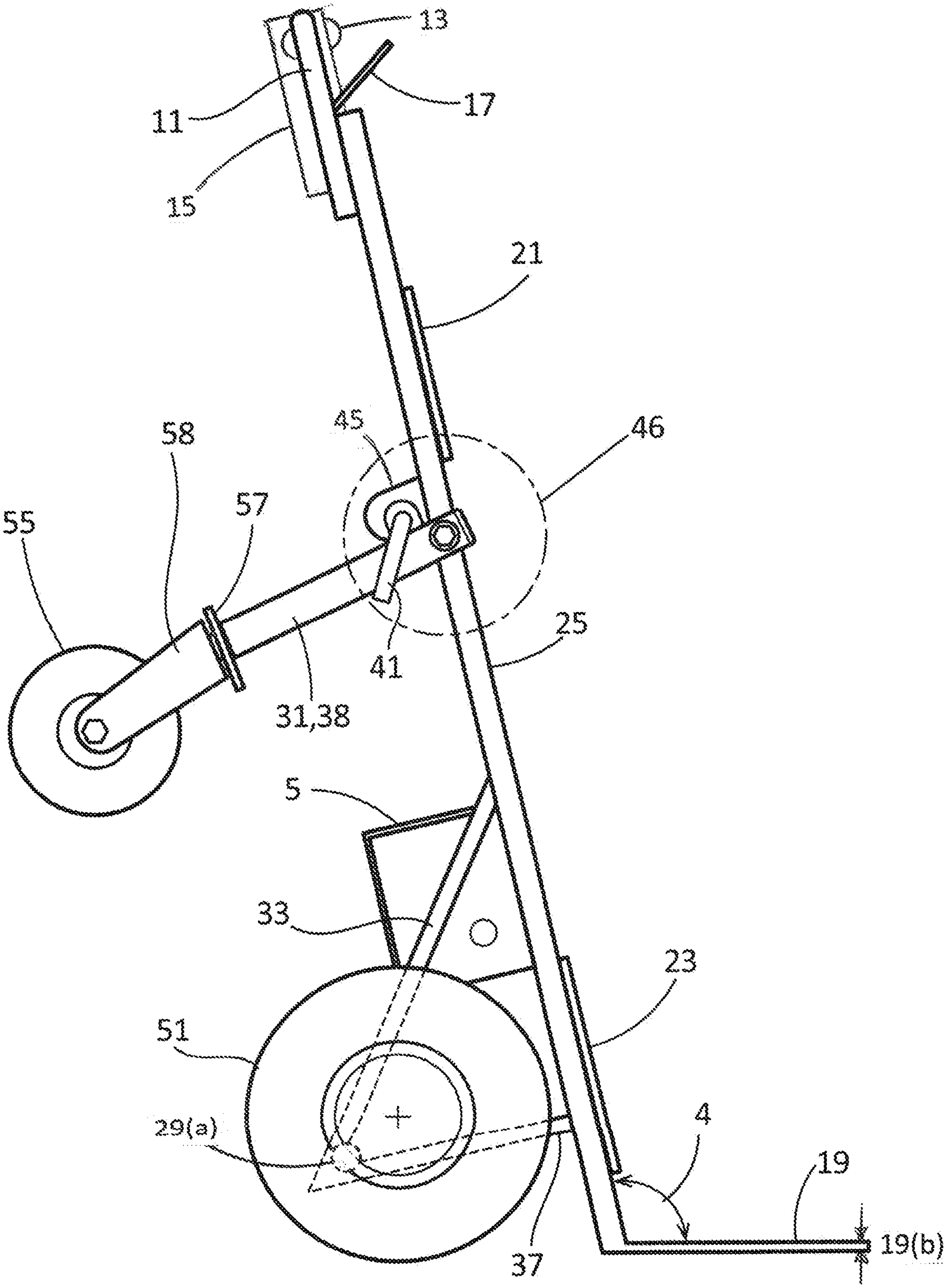

FIG. 3 depicts a profile view of the right side of the electric mover 1, further showing the handlebar 11 the right vertical rail 25, the right main drive tire 51, the right moveable leg 31, right caster wheel 55, the controller box 5, the right angled strut 33, and the right edge of the load plate 19.

Figure 3A:
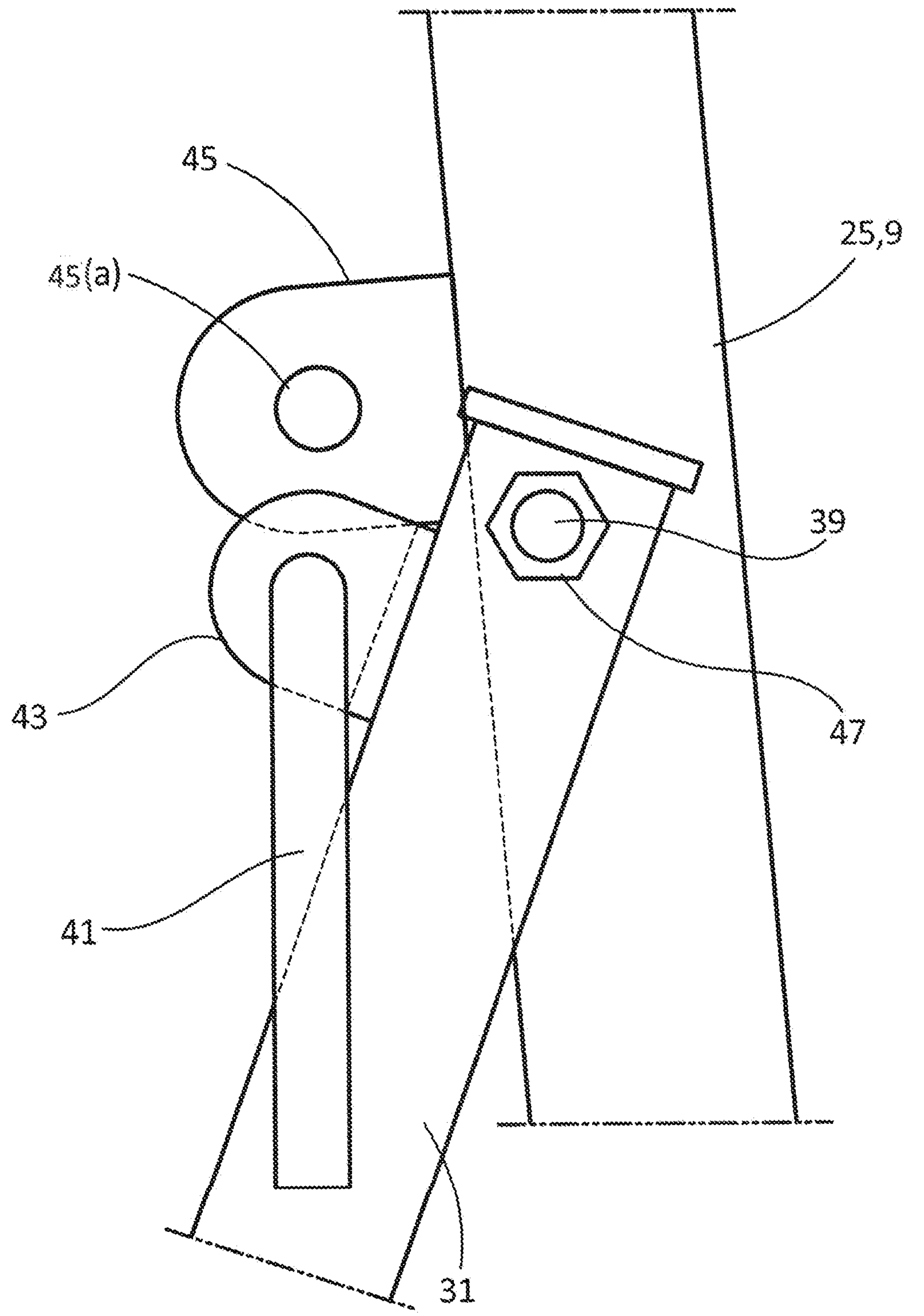

FIG. 3A is an enlargement of the item view 46 of FIG. 3, displaying an expanded profile view of an angle iron 45, the right U-brace 43 of the electric mover 1, further showing the stowed configuration of the right moveable leg 31, relative to the frame 9 of the electric mover 1.

Figure 4:
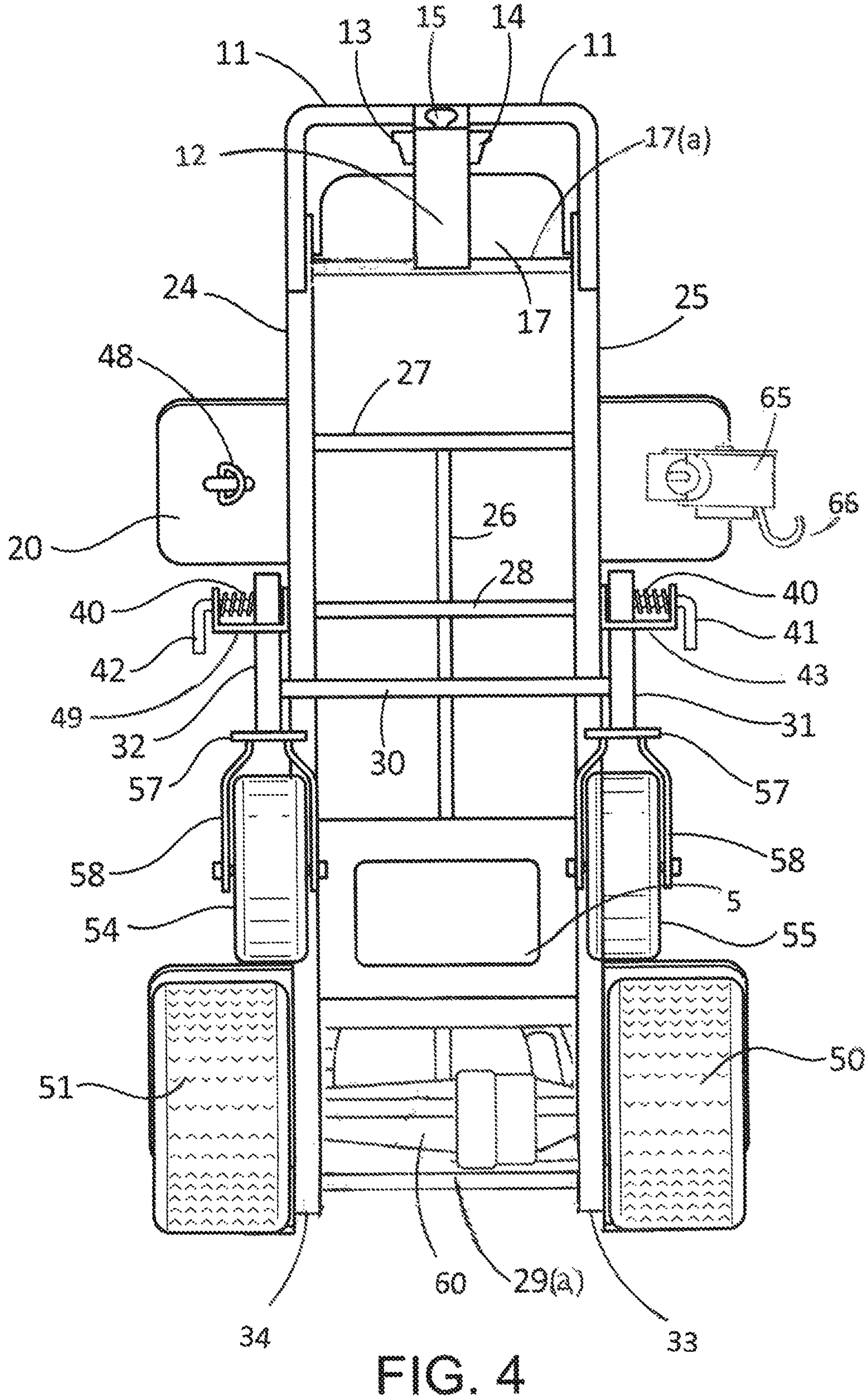

FIG. 4 illustrates a direct view of the rear surfaces of the electric mover 1, showing the handlebar grips 11, left and right vertical rails 24, 25, left and right thumb throttles 13, 14, the left and right upper load stabilizers 20, 21, controller box 5, the left and right moveable legs 32, 31, left and right caster wheels 54, 55, and the left and right main drive tires 50, 51.

Figure 5:
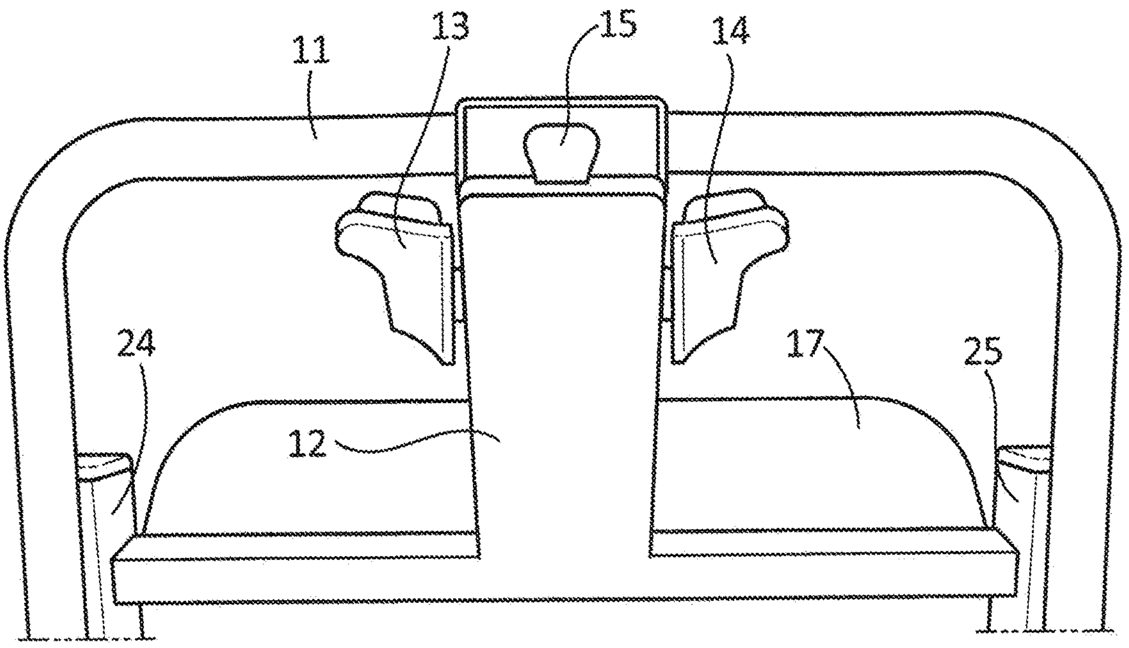

FIG. 5 displays a close-up view of the rear of the handlebar grips 11, the throttle casing 12, left and right thumb throttles 13, 14, and the upper protection plate 17.

Figure 6:
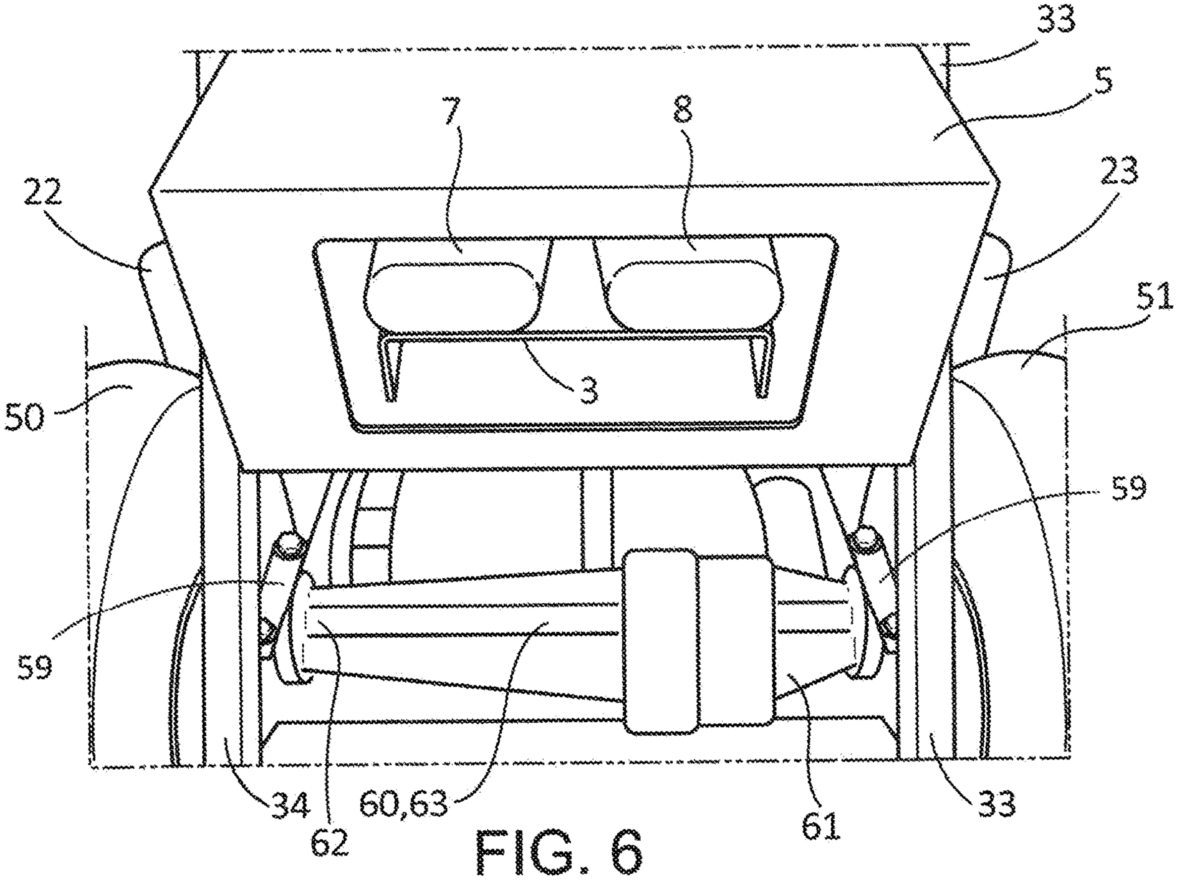

FIG. 6 illustrates a rear view of the controller box 5, containing two replaceable batteries 7, 8, the transaxle 60, and the left and right drive tires 50, 51.

Figure 7:
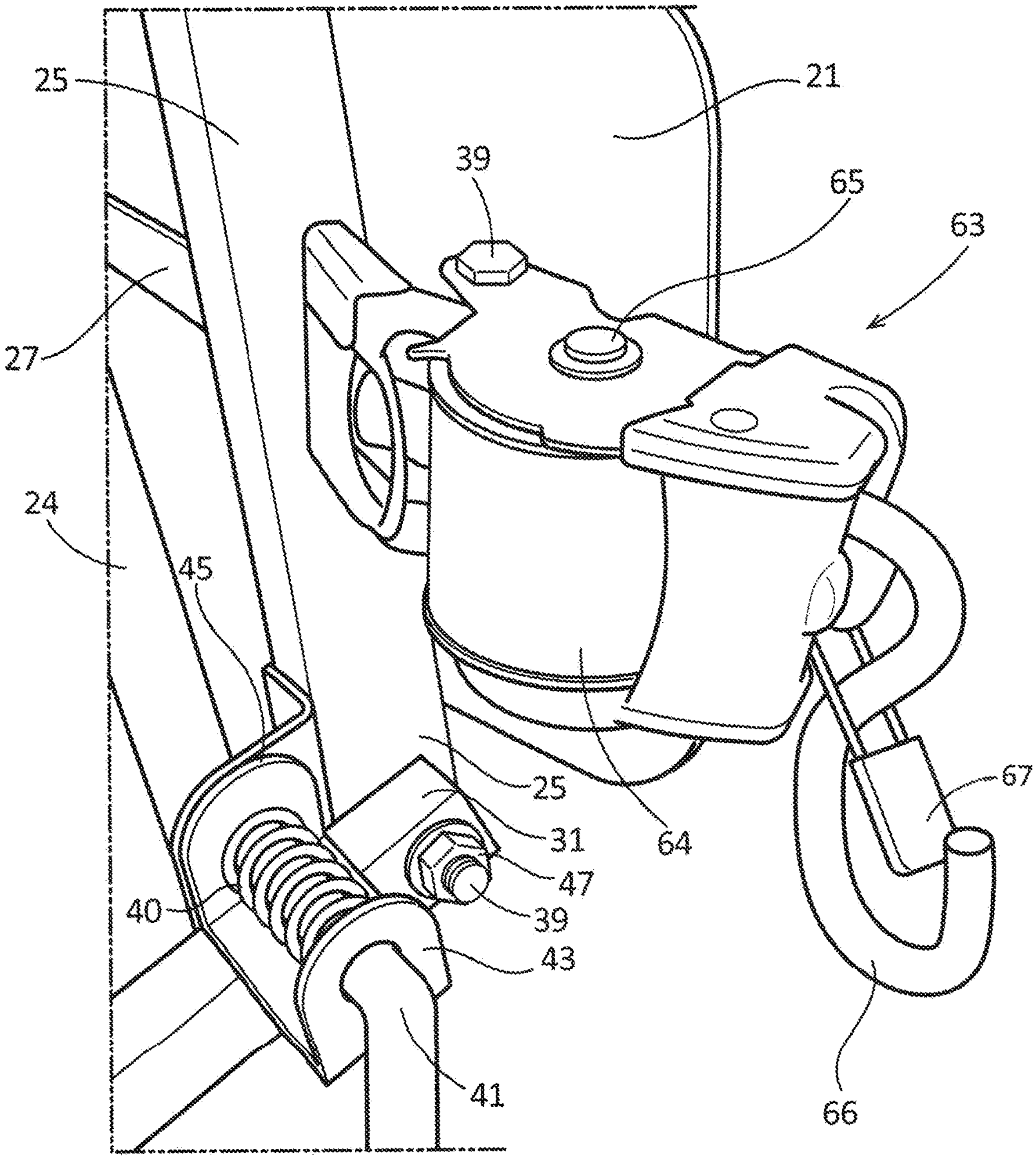

FIG. 7 presents a closeup view of the casing 63 which contains a retractable strap 64, the first end of the strap 64 coupled to the restraining bolt of an internal spring-loaded reel mechanism 65, further showing the second end of the strap 64 connected to a clevis safety hook 66.

Figure 8:
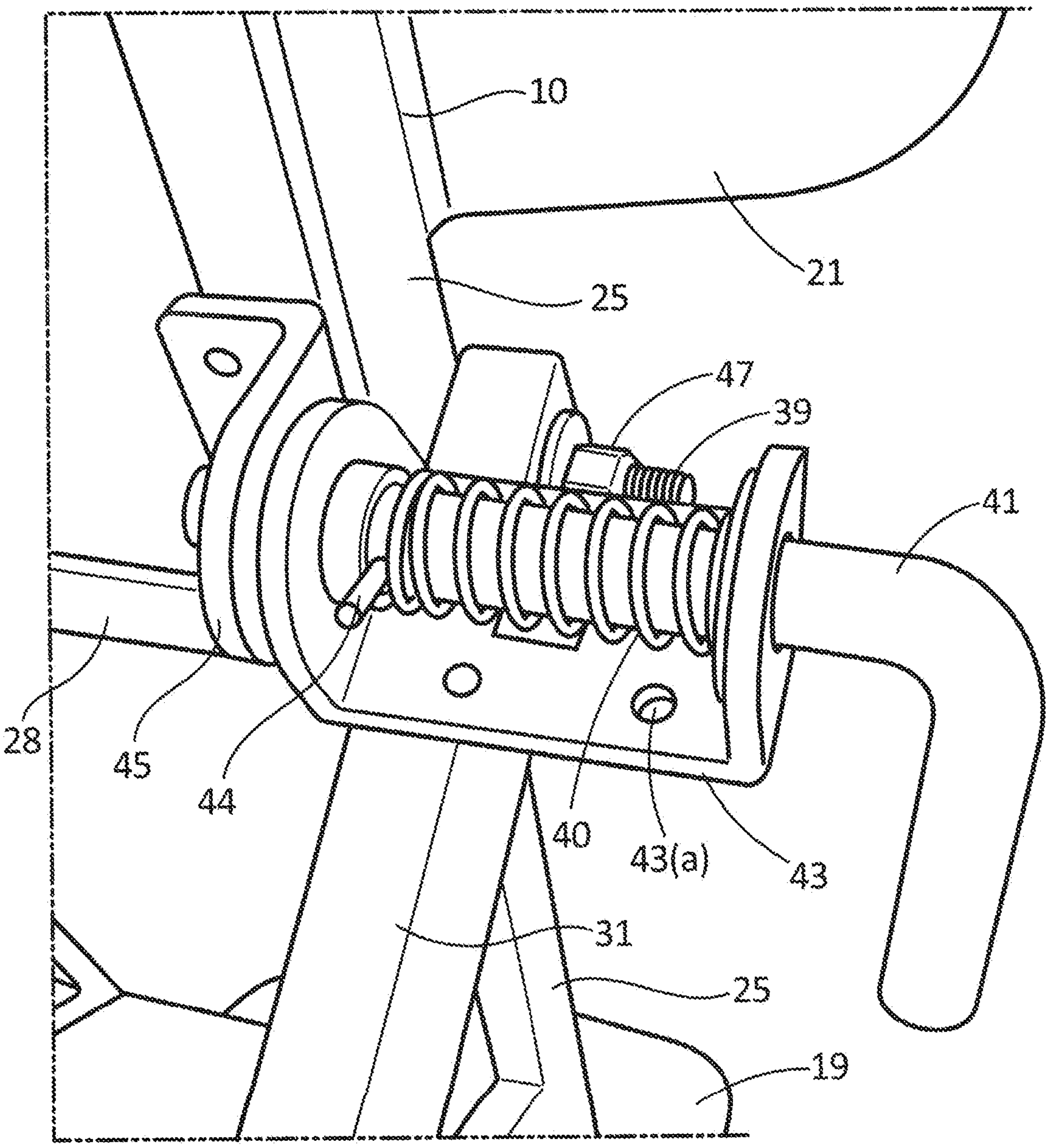

FIG. 8 is an enlarged view of one of the right spring-loaded locking latch pin 41, used to compress or release a coil spring 40, thereby varying the placement of the right moveable leg 31 of the positionable leg assembly 38.

FIG. 9 is a downward-looking view of a fork extensions assembly 80, specifically the right extension 81 and its parallel left extension 82, the fork extensions assembly 80 being extended proximate the bearing surface 19(*a*) of the load plate 19.

FIG. 10 depicts a cross-sectional view of the left extension 82, a tubular cylinder 88, the left tiered hollow clamp 84, and the load plate 19, as seen from the perspective indicated by section line A-A of FIG. 9.

Figure 11:
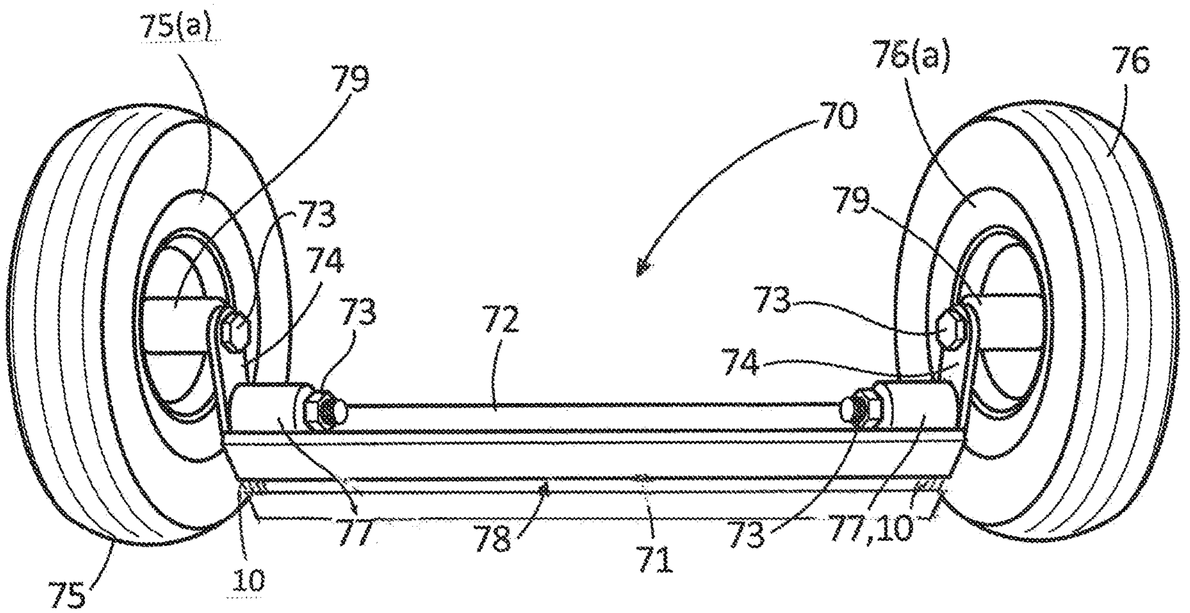

FIG. 11 presents a stand-alone view of the rolling attachment 70, along with its lower L-beam 72 and upper L-beam 71, the L-beams 71, 72 shown joined to the left rolling wheel 75 and the right rolling wheel 76, respectively.

Figure 12:
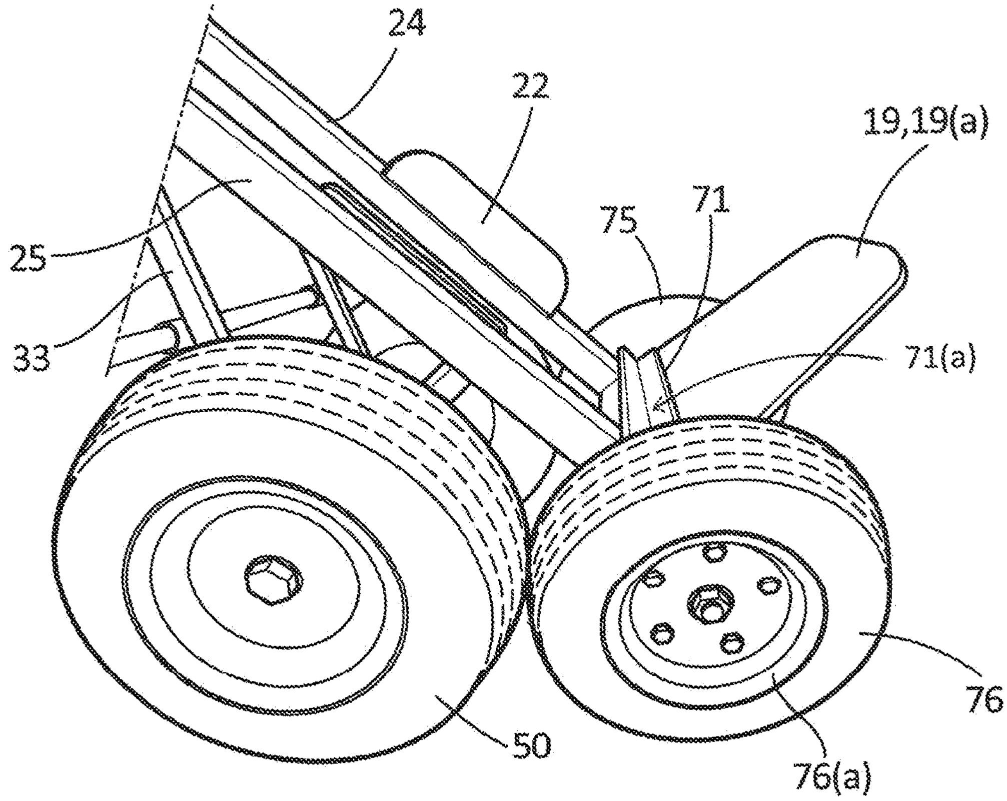

FIG. 12 illustrates the right-side view of the rolling attachment 70 as placed in operational use, further showing the upper L-beam 71 abutting the load plate bearing surface 19(*a*).

Figure 13:
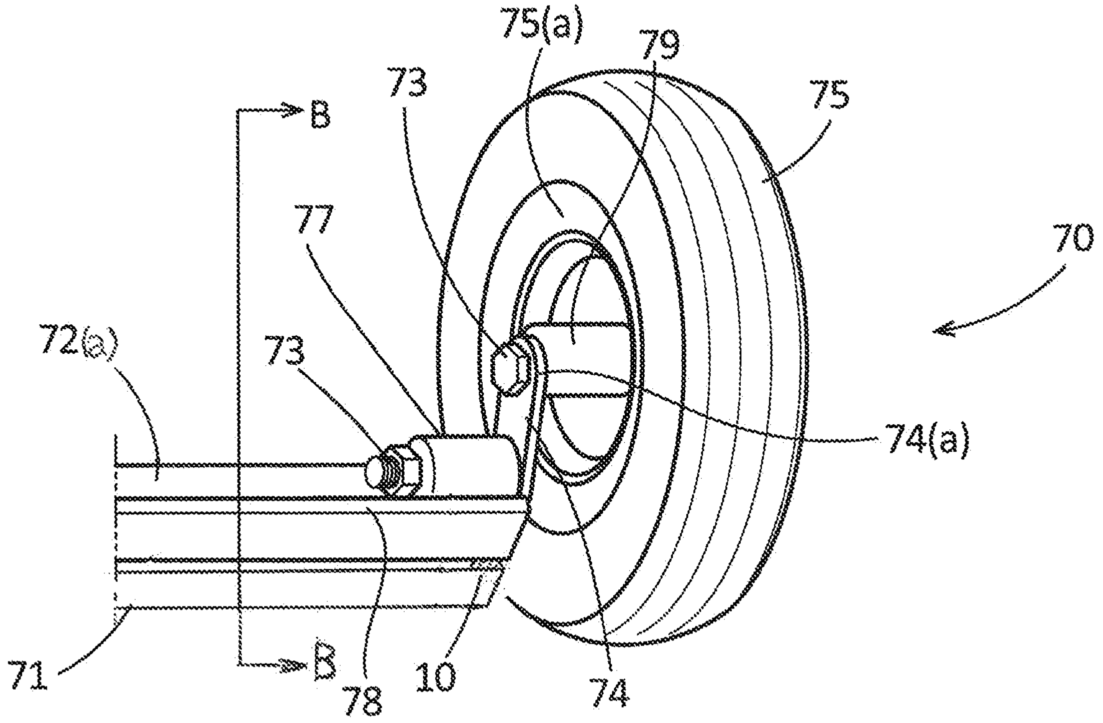

FIG. 13 shows the inner surface of the left rolling wheel 75 of the rolling attachment 70, specifically showing the orientation of the lower L-beam 72 and upper L-beam 71 when the rolling attachment 70 is not in use.

Figure 14:
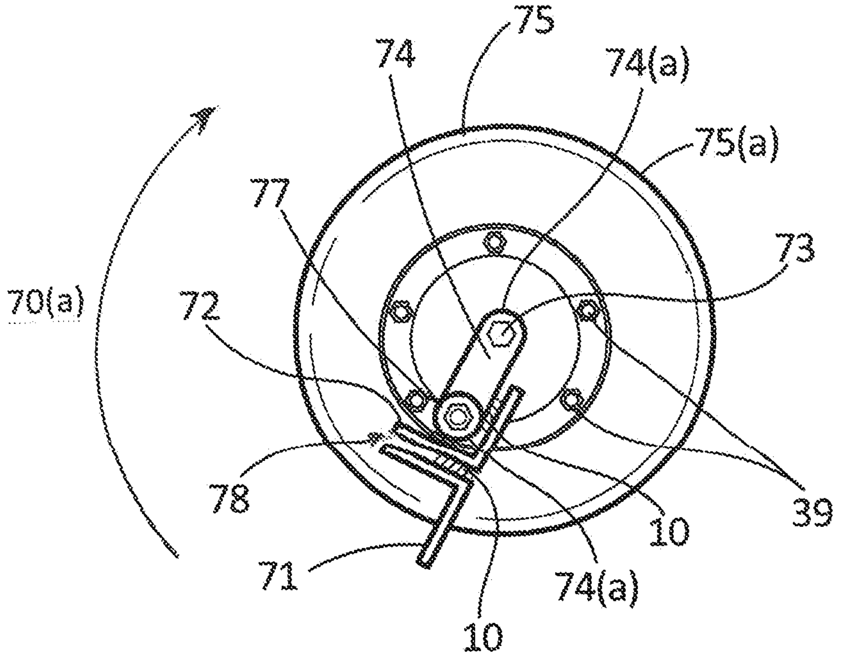

FIG. 14 presents across-sectional view of the upper L-beam 72 and lower L-beam 71, of the rolling attachment 70, as seen from perspective of section line B-B of FIG. 13.

| Table of Nomenclature & Part Numbers of Invention |
|---|
| 1. Electric mover |
| 2. n/a |
| 3. Support shelf |
| 4. Angular displacement |
| 5. Controller box |
| 5(a) Opening |
| 6. Battery cover |
| 7. First battery |
| 8. Second battery |
| 9. Main frame |
| 10. Weld |
| 11. Handlebar (& grips?) |
| 12. Throttle casing |
| 13. Left thumb throttle |
| 14. Right thumb throttle |
| 15. On/Off Switch |
| 16. Lower support structure? |
| 17. Upper protection plate |
| 17(a) Mounting bar |
| 18. Lower protection plate |
| 19. Load plate |
| 19(a) Load plate bearing surface |
| 19(b) Thickness |
| 20. Upper left load stabilizer |
| 21. Upper right load stabilizer |
| 22. Lower left load stabilizer |
| 23. Lower right load stabilizer |
| 24. Left vertical rail |
| 24(a) Left inner rail |
| 25. Right vertical rail |
| 25(a) Right inner rail |
| 26. Center load brace bar |
| 27. Upper load brace bar |
| 28. Lower load brace bar |
| 29. Bottom load brace bar |
| 29(a) Leverage bar |
| 30. Cross-leg stabilizer |
| 31. Right moveable leg |
| 32. Left moveable leg |

-continued

| Table of Nomenclature & Part Numbers of Invention |
| --- |
| 33. Right angled strut |
| 34. Left angled strut |
| 35. Cross-strut |
| 36. Left brace |
| 37. Right brace |
| 38. Positionable leg assembly |
| 39. Hexagonal head bolt |
| 40. Coil spring |
| 41. Right locking latch pin |
| 42. Left locking latch pin |
| 43. Right U-brace |
| 43(a) Centered hole |
| 44. Rod |
| 45. Angle iron |
| 45(a) Centered orifice |
| 46. Enlarged item view |
| 47. Nut |
| 48. D-ring |
| 49. Left U-brace (not in view) |
| 49(a) Centered hole |
| 50. Left drive tire |
| 51. Right drive tire |
| 52. Left hub |
| 53. Right hub |
| 54. Left caster wheel |
| 55. Right caster wheel |
| 56. Left swivel caster |
| 57. Right swivel caster |
| 58. Caster mount |
| 59. Bolted clamping device |
| 60. Transaxle |
| 61. Transaxle right drive shaft |
| 62. Transaxle left drive shaft |
| 63. Casing |
| 64. Retractable strap |
| 65. Reel mechanism (bolt) |
| 66. Clevis safety hook |
| 67. Retaining tab |
| 68-69. n/a |
| 70. Rolling attachment |
| 70.(a) Clockwise rotation |
| 71. Upper L-Beam |
| 71(a) Inner channel |
| 72. Lower L-Beam |
| 72(a) Inner channel |
| 73. Coupling bolt |
| 74. Double-aperture plate |
| 74(a) Plate first end |
| 74(b) Plate second end |
| 75. Left rolling wheel |
| 75(a) Left rim |
| 76. Right rolling wheel |
| 76(a) Right rim |
| 77. Connector |
| 78. Gap |
| 79. Hub socket |
| 80. Fork extensions assembly |
| 81. Right extension |
| 81(a) Right extension tip |
| 81(b) Right pivoting end |
| 82. Left extension |
| 82(a) Left extension tip |
| 82(b) Left pivoting end |
| 83. Right tiered curved hollow bracket |
| 84. Left tiered curved hollow bracket |
| 85. Curvature |
| 86. Arc |
| 87. End brace |
| 88. Tubular cylinder |
| 89. Lateral adjustment |

DETAILED DESCRIPTION OF THE INVENTION

The objects, features, and advantages of the inventive concept presented in this application are more readily understood when referring to the accompanying drawings. The drawings, totaling fifteen figures, show the basic components and functions of embodiments and/or methods of use. In the several figures, like reference numbers are used in each figure to correspond to the same component as may be depicted in other figures.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The inventive concept disclosed herein generally relates to a manually operated hand truck that can also be electrically powered, the apparatus referred to as an "electric mover" 1. The discussion of the electric mover 1 will be initiated with FIG. 1, in which a typical embodiment of the electric mover 1 apparatus is illustrated.

In the preferred embodiment, the main frame 9 of the electric mover 1 comprises a handlebar 11, a right vertical rail 25, a left vertical rail 24, a center load brace bar 26, an upper load brace bar 27, a lower load brace bar 28, a bottom brace bar 29, an upper right load stabilizer 21, an upper left load stabilizer 20, a lower right load stabilizer 23, a lower left load stabilizer 22, a lower protection plate 18, and a multi-use load plate 19. A lower support structure 16 is fabricated in conjunction with the main frame 9. In the preferred embodiment, the main frame components and lower support structure 16 are joined by multiple welded 10 junctions. The multi-use load plate 19 is utilized in the attachment of components and accessories of the electric mover 1.

The basic electric mover 1 is constructed with an integral positionable leg assembly 38, which is visible in FIG. 1, FIG. 3, and FIG. 4. The positionable leg assembly 38 comprising two moveable legs 31, 32, each of the movable legs 31, 32 connected to a right caster wheel 55, and a left caster wheel 55, respectively. Two locking latch pins 41, 42, and other structural components facilitate positioning the moveable legs 31, 32, which will be made more understandable in the proceeding discussions and illustrations. The positionable leg assembly 38, may be pivotally arranged at variable angular relationships to the frame 9, thus allowing the moveable legs 31, 32, and caster wheels 54, 55 to provide additional structural support for oversized and/or weighty cargo placed on the electric mover 1. Also shown in FIG. 1 is a partial view of a right angled strut 33, a component of the lower support structure 16.

FIG. 2 displays a direct, isolated view of the frontal surfaces only, of the electric mover 1. In the preferred embodiment, the electric mover 1 is designed having a total vertical length of approximately 68 inches, and a width in the range of 20 to 22 inches, which facilitates maneuvering of the electric mover 1 by most users. Components in view in FIG. 2 include the handlebar 11, an upper protection plate 17 and left and right thumb throttles 13, 14, which are typical of those commercially available. Thumb throttles of this type, include the type manufactured under the brand name, Curtis© ET-126. The upper protection plate 17, serves to shield the space proximate the left and right thumb throttles 13, 14 from oversized loads.

Further shown in FIG. 2 are the frontal surfaces of the right vertical rail 25, left vertical rail 24, a center load brace bar 26, an upper load brace bar 27, a lower load brace bar 28, a lower protection plate 18, and a bottom load brace bar 29. All the forementioned items comprise the general frame 9 of the electric mover 1. The lower protection plate 18 serves to shield a user from spillage or excessive rearward protrusion of any load item that may be transported.

Additionally shown in FIG. 2 are the upper right load stabilizer 21, the upper left load stabilizer 20, lower right load stabilizer 23, lower right load stabilizer 22, and the leading edge of the load plate 19. The upper left and right load stabilizers 21, 22, and the lower left and right load stabilizers 23, 22 assist in providing additional support of oversized or bulky loads that may be placed upon the load plate 19. Portions of the left drive tire 50 and right drive tire 51 are also in view.

FIG. 3, displays a profile view of the right side of the electric mover 1. The topmost section of FIG. 3 shows the handle bar 11, as attached to the rear surface of the right vertical rail 25. The upper protection plate 17 is also shown. In viewing the length of the right vertical rail 25, there is shown the right upper load stabilizer 21 and right lower load stabilizer 23, both of which are welded to the frontal surface of the right vertical rail 25 in the preferred embodiment. Further, the load plate 19 is structurally welded to the lower surface of the bottom brace bar 29 (not in view).

In FIG. 3, it is to be noted that the right vertical rail 25 (and similarly, the left vertical rail 24) are mutually constructed at a ten-degree angular displacement 4 from the upper surface plane of the load plate 19. This feature renders it easier for users to arrange an item(s) onto the load plate 19 and afterwards, readily tip the electric mover 1 rearward for better balance and maneuverability of the item.

FIG. 3 also shows a view of the right moveable leg 31 of the positionable leg assembly 38, along with a right swivel caster 57, a right caster extension 58, and the right caster wheel 55 at the bottommost end of the right moveable leg 31. The extended, or operational configuration of the positionable leg assembly 38 is depicted in FIG. 3, showing the topmost end of the right moveable leg 31 relatively perpendicular to the right vertical rail 25. This configuration is maintained by virtue of a locking latch pin 41 simultaneously inserted into a centered hole 43(*a*) right U-brace 43 and into an angle iron 45, the angle iron 45 being permanently welded to the right vertical rail 25. Similarly, a left locking latch pin 42 is inserted into both a centered hole 49(*a*) in the left U-brace 49 on the left moveable leg 32 (not in view) and into an angle iron 45, which is permanently welded to the left vertical rail 24.

This operational position of the positionable leg assembly 38 may be altered to a stowed configuration by a user pulling both spring-loaded right and left locking latch pins 41, 42, from their nesting within the two respective angle irons 45, thereby allowing the positionable leg assembly 38 to be rotated downward within an arc range, and stowed closer to the right vertical leg 25 and left vertical leg 24. FIG. 3A displays a clearer rendering of these maneuvers.

Both the right moveable leg 31 and the left moveable leg 32 (out of view in FIG. 3) are connected, at their midpoints, by a cross-leg stabilizer 30 (shown in FIG. 1 and in FIG. 4). Therefore, the adjustment just described must also be performed with the left moveable leg 32 relative to the left vertical rail 24 in order to facilitate the corresponding re-positioning of the entire positionable leg assembly 38.

FIG. 3A and also FIG. 8 provide complementary views of the operation of the right locking latch pin 41. FIG. 3A displays an expanded view of the right locking latch pin 41, in accordance with the circled item 46 of FIG. 3.

FIG. 3A displays the arrangement of the right locking latch pin 41, upon its removal from the angle iron orifice 45(*a*), thus allowing the right moveable leg 31 to swing freely downward, closer to the right vertical rail 25. Likewise, because of the single unit construction of the positionable leg assembly 38, it is necessary that the left moveable leg 32 (not shown) also be released by the removal of the left locking latch pin 42 from its corresponding angle iron orifice 45(*a*) on the left moveable leg 32. In this manner, the "stowed" position of the right moveable leg 31 is achieved, which corresponds to the stowed position of the entirety of the positionable leg assembly 38.

Again, referring to FIG. 3, a partial view of the right side of the lower support structure 16, which connects to the main frame 9 is presented. An angled strut 33 is attached at its upper end to the right vertical rail 25 and attached at its lower end to the first end of a right brace 37, forming a V-shaped junction. Further, the second end of the right brace 37 is orthogonally affixed, preferably by welding, to the lower segment of the right rail 25.

At the V-shaped junction of the right angled strut 33 and the right brace 37 there is attached the right end of a horizontally-oriented leverage bar 29(*a*), (not in view). The leverage bar 29(*a*) is essentially a cylindrical rod, its right end being indicated by a small circle with dashed lines in FIG. 3. The leverage bar 29(*a*) extends horizontally and connects, at its left end, to a similar V-shaped junction of a left angled strut 34 and a left brace 36.

In the same relative construction arrangement, the left angled strut 34 attaches at its upper end to the left rail 24 and at its lower end, at an acute angle to the left brace 36. The horizontal leverage bar 29(*a*) is also displayed in FIG. 4. These named components thusly comprise the lower support structure 16.

The lower support structure 16 provides support for the transaxle 60 of the electric mover 1. Although the transaxle 60 is not in view in FIG. 3, its relative positioning is further indicated in FIG. 4 and FIG. 6. The horizontal axis of the transaxle 60 is concentric with both the rim of the right drive tire 51 and the rim of the left drive tire 50. Further, a right-angle strut 33 and a right brace 37 are each welded to the right vertical rail 25, to provide structural support for the housing of the transaxle 60.

Similarly, on the left side of the frame 9, a left angle-strut 34 and a left brace 36, each wielded to the left vertical rail 24, also provide support to the housing of the transaxle 60. In FIG. 3, dashed lines indicate the position of a bolted mounting device 59, which is affixed to the right brace 37. A bolted mounting device 59 is attached to each the left brace 36 and the right brace 37, respectively, for the purpose of supporting the transaxle 60. This arrangement is also shown in FIG. 6.

FIG. 3. FIG. 4, and FIG. 6 depict a controller box 5, utilized for housing two replaceable batteries 7, 8. The controller box 5 is mutually supported on its right side by the right angled strut 33 and a right brace 37, both connected to the right rail 25. Similarly, the controller box 5 is supported on its left side by the left angled strut 34 and the left brace 36 (partially in view in FIG. 6).

FIG. 4 provides further clarification of the location of both the right locking latch pin 41 and left locking latch pin 42. FIG. 3 is the configuration of the right locking latch pin 41 inserted into the right angle iron 45, which places the positionable leg assembly 38 in an extended, operating position. The extended position allows a user to lower the electric mover 1 such that the right caster wheel 55 and the left caster wheel 54 may simultaneously contact the ground or other hard surface to provide additional weight support along with the main drive wheels 50, 51 when hauling heavy or cumbersome items.

FIG. 4 presents a direct view of the rear of the electric mover 1. The top section of FIG. 4 shows a handlebar 11, an upper protection plate 17 and its mounting bar 17(*a*), a throttle casing 12, left and right thumb throttles 13, 14, and an On/Off switch 15. The On/Off switch 15 controls dc electric power from two batteries 7, 8 stored in a controller box 5. The throttle casing 12 serves to protect the space proximate the left and right thumb throttles 13, 14 from inadvertent jostling by a transported load. Further shown in FIG. 4 are the rear surfaces of the right vertical rail 25, left vertical rail 24, the center load brace bar 26, an upper load brace bar 27, the lower load brace bar 28, and the leverage bar 29(*a*).

In FIG. 4, the rear surface of the upper left load stabilizer 20 and the upper right load stabilizer 21 are in view. Further shown, on the rear of the right load stabilizer 21, is a casing 63 containing a retractable strap 64 and its attached Clevis safety hook 66. The rear surface of the left load stabilizer displays an attached D-ring 48. The D-ring 48 serves to anchor the clevis safety hook 66 integral to the free end of a retractable strap 64 (shown in greater detail in FIG. 7) when a transportable load must be strapped securely upon the load plate 19.

Also visible in FIG. 4 is the transaxle 60, which utilizes battery power for turning the hubs 53, 52 of both the right drive tire 51 and the left drive tire 50. Additionally shown are the rear surfaces of the right angled strut 33 and the left angled strut 34, which are components of the lower support structure 16.

FIG. 4 also shows the rear surfaces of the right moveable leg 31, the cross-leg stabilizer 30, and the left moveable leg 32. Additionally, the right swivel caster 57, right caster extension 58, the right caster wheel 55, the left swivel caster 56, left caster extension 58, and the left caster wheel 54. As previously noted, the angle of both moveable legs 31, 32, relative to the frame 9, may be altered by a user pulling, in sequence, two spring-loaded locking latch pins 41, 42, thereby allowing each moveable leg 31, 32, to be moved within the range of a small arc. Further shown, in FIG. 4, is the horizontal leverage bar 29(*a*) connecting the left-angled strut 34 and the right-angled strut 33. The leverage bar 29(*a*) is an important component, serving as a rigid tube upon which a user's foot may be placed to acquire mechanical advantage when tilting the electric mover 1 back towards the user.

FIG. 5 displays a close-up view of rear surfaces of the handlebar 11 grips, the throttle casing 12, left and right thumb throttles 13, 14, the throttle casing 12, the on-off switch 15, and the upper protection plate 17. The upper protection plate 17 and the throttle casing 12 are attached to a mounting bar 17(*a*), which extends between the left vertical rail 24 and right vertical rail 25, partially shown.

FIG. 6 illustrates a rear view of the lower structure of the electric mover 1, showing the controller box 5 housing two replaceable batteries 7, 8, both of which are secured to the top surface of a support shelf 3. Adequate electrical wiring is provided for connecting terminals on both batteries 7, 8 to the thumb throttles 13, 14, and terminals on the transaxle 60. In the preferred embodiment, each battery 7, 8 may be easily replaced if either or both are damaged or in a discharged state. The transaxle is shown positioned immediately below the controller box 5.

As stated earlier, the left angular strut 34 and right angular strut 33 of the lower support structure 16 provide structural support for the controller box 5, the transaxle casing 63, left transaxle driveshaft 62, and right transaxle driveshaft 61. Both driveshafts 62, 61 are connected to the respective hub 52 of the left drive wheel 50 and the hub 53 of the right drive wheel 51. FIG. 6 depicts the location of two bolted clamping devices 59, attached to the left brace 36 and right brace 37, respectively. The bolted clamping devices 59 support the transaxle casing 63.

The transaxle 60 receives its power from the two batteries 7, 8, by means of electric wiring to from junctions within the control box 5, which wiring is inserted through apertures in the bottom of the control box 5. The wiring is further routed within the interior of the left or right vertical rail 24, 25, to junctions attached to the right and left thumb throttles 13, 14. Thus, a user operates the thumb throttles 13, 14 to transmit electrical power to the transaxle 60. The transaxle 60 thereby rotates the left and right drive wheels 50, 51 at variable speeds, dependent on the quantity of electric current selected by moving the left and right thumb throttles 13, 14.

FIG. 7 presents a close-up view of a casing 63 which encloses a retractable strap 64. The first end of the retractable strap 64 (not in view) is coupled to the restraining bolt of an internal spring-loaded reel mechanism 65). The retractable strap 64 terminates at its second, or free end, with the attachment of a Clevis safety hook 66. As shown, the casing 63 is attached to the rear surface of the upper right load stabilizer 21. Also in view in FIG. 7 is the upper end of the right moveable leg 31, the right moveable leg 31 being rotatingly connected to the right vertical leg 25.

When the retractable strap 64 is used to secure a load item on the electric mover 1, the Clevis safety hook 66 and its integral retaining tab 67 are simultaneously grasped and, together with the retractable strap 64, are pulled from the casing 63. The retractable strap 64 is then wrapped around the load item. The Clevis safety hook 66 must then be fastened to a D-ring 48 welded to the rear surface of the upper left load stabilizer 20 (shown in FIG. 4). FIG. 7 further shows the relative position of the strap casing 63 relative to the right locking latch pin 41 and its corresponding coil spring 40.

FIG. 8 illustrates a close-up view of the right U-brace 43 which is welded to the top surface of the right moveable leg 31. The U-brace 43 is constructed with two concentric orifices through which the right locking latch pin 41 extends. The two concentric orifices are also concentric with a circular hole (not in view) in the angle iron 45, thus enabling the angle iron 45 to support the terminal end of the right locking latch pin 41. It is to be noted that the locking latch pin 41 has a wrap-around coil spring 40, the spring 40 terminating at one end to form an integral protruding rod 44. The rod 44 provides a terminal restraint to the coil spring 40 tension against the rotation of the handle of the locking latch pin 43.

FIG. 8 demonstrates that, when necessary to reposition the right moveable leg 31, the locking latch pin 41 must be pulled outward, which causes the coil spring 40 to compress and free the shaft of the locking latch pin 41 from the angle iron 45. This, in turn, causes the right moveable leg 31 to rotate about a hexagonal head bolt 39. The user may select a hole 43(*a*) within which to insert the rod 44. This operation then allows the right moveable leg 31 to be positioned at a different angle relative to the frame 9 of the electric mover

1. Similarly, on the left side, the user must pull and rotate a left locking latch pin 42 and perform the same operation to free the left moveable leg 32, thus the two moveable legs 31, 32 move in unison as the positionable leg assembly 38.

In viewing FIG. 9, there is displayed a detachable fork extension assembly 80, the main components being an elongated, planar right extension 81 and an elongated, planar left extension 82. FIG. 9 illustrates the operating position of the fork extension assembly 80, as attached to the electric mover 1. Both planar extensions 81, 82 are normally oriented parallel to each other, and are jointly in abutment to the load bearing surface 19(*a*) of the load plate 19. As shown in FIG. 9, the elongated right planar extension 81 comprises a right extension tip 81(*a*) and a right pivoting end 81(*b*). Similarly, the left planar extension 82 is constructed having a left extension tip 82(*a*) and a left pivoting end 82(*b*). The pivoting ends 81(*b*), 82(*b*) can be rotated about a tubular cylinder 88, between a horizontal working position and a vertical, stowed position.

To facilitate uniform rotation of the two extensions 81, 82, their pivoting ends 81(*b*), 82(*b*), are welded 10 to a right tiered curved hollow bracket 83 and a left tiered curved hollow bracket 84, respectively. As further clarification, FIG. 10 displays a cross-sectional view of the left tiered curved hollow bracket 84 as seen from the perspective of section line A-A of FIG. 9. The right tiered curved hollow bracket 85 is also constructed in the same manner. FIG. 9 and FIG. 10 show that the tubular cylinder 88 has an exterior circular curvature 85 and an interior circular curvature. Further, the exterior circular curvature 85 defines the outer circumference of the tubular cylinder 88.

The cross-sectional profile of the left tiered hollow bracket 84 in FIG. 10 is shown to comprise a lower tier 84(*b*) and an upper tier 84(*a*). It is to be noted that the underside of the lower tier 84(*b*) of the left tiered bracket, 84 is welded 10 to the pivotal end 82(*b*) of the left extension 82.

FIG. 9 depicts that the tubular cylinder 88 terminates at its left end and its right end with an L-shaped end brace 87 integral to both the left and right ends of the tubular cylinder 88. Each end brace 87 is constructed with an orifice (not in view) which facilitates attachment of the left and right ends of the tubular cylinder 88 to the left vertical rail 24 and to the right vertical rail 25, respectively. As illustrated in FIG. 9, both end braces 87 utilize hexagonal head bolts 39, which are inserted co-axially through compatible orifices (out of view) in the lower part of the left and right vertical rails 24, 25. As a result, the tubular cylinder 88 remains in a stationary horizontal position, allowing the pivoting ends 82(*b*), 81(*b*) of the left and right extensions 82, 81 to rotate independently about the outer circumference of the tubular cylinder 88.

The fork extensions assembly 80 is constructed as a unit, with both fork extensions, 81, 82 having the internal circular curvatures 85 of their tiered hollow brackets 83, 84 enveloping the outer surface of the tubular cylinder 88. Upon completion of any required work project, the fork extensions assembly 80 is normally stored in an upright, vertical position, with both extensions 81, 82 abutting the lower protection plate 18. The fork extensions assembly 80 is entirely detachable by removing both hexagonal head bolts 39 and lifting the fork extensions assembly 80 clear of the electric mover 1.

When it is necessary to operate the fork extensions assembly 80, a user must grasp the planar extensions 81, 82 and move them downward. As shown in FIG. 10, this action causes both planar extensions 81, 82 to individually move, within a range of an approximately ninety-degree arc 86, resulting in jointly abutting the load plate 19. Each planar extension 81, 82, is also slidable, to the right or left, along the exterior surface of the tubular cylinder 88, within a lateral adjustment range 89, shown in FIG. 9.

Again, referring to FIG. 10, it is seen that the curvature 85 of the left tiered hollow clamp 84, fits securely over the tubular cylinder 88. The left extension 82 of the fork extensions assembly 80 is constructed parallel to, and in abutment to the load plate 19. The bottom portion of both tiered hollow clamps 83, 84 may come in contact with the frontal surface of the bottom brace bar 29 of the electric mover 1 during use.

Although not illustrated, it must be noted that an identical curvature 85 exists interiorly to the right tiered hollow clamp 83 which is similarly welded 10 onto the right extension 81. This curvature 85 fits securely over the tubular cylinder 88, which enables both extension 81, 82 of the fork extensions assembly 80 to move in unison with, or independently of, each other. In FIG. 9 both extensions 81, 82 are shown positioned parallel to the bearing surface 19(*a*) of the load plate 19. FIG. 10 further illustrates the range of the travel arc 86 in which the left extension 82 travels from its load bearing position proximate the load plate 19 to the upright stowed position.

FIG. 11 presents a stand-alone view of a component of the electric mover 1, referred to as a rolling attachment 70. The rolling attachment 70 essentially comprises two co-axial wheels, being a right rolling wheel 76 and its hub socket 79, and a left rolling wheel 75 and its hub socket 79. Other components of the rolling attachment 70 include a lower L-beam 72, an upper L-beam 71, two identical, planar, double-aperture plates 74, and two identical cylindrical connectors 77. Each double-aperture plate 74 has an aperture at its first end, and an additional aperture at its second end.

The rolling attachment 70 is shown in a static, stowable configuration. Also visible is a partial view of a linear gap 78, which extends lengthwise parallel to both the upper L-beam 71 and lower L-beam 72. Two welds 10, applied at each end of both L-beams 71, 72, join them in a "back-to-back" manner, leaving the inner "channel" 71(*a*), 72(*a*), of each L-beam 71, 72 exposed.

FIG. 12 illustrates the manner in which the rolling attachment 70 is placed in operational use in conjunction with the electric mover 1. It is to be noted that the load plate 19 is occupying the previously-shown gap 78 of the rolling attachment 70. The gap 78 is of a dimension sufficient to provide a secure fit of the outer surfaces of both L-beams 71, 72 above and below the thickness 19(*b*) of the load plate 19. The upper L-beam 71 is shown abutting the bearing surface 19(*a*) of the load plate 19.

Referring again to FIG. 11, the upper L-beam 72 facilitates connection of the conjoined L-beams 71, 72, to the left rolling wheel 75 and right rolling wheel 76 by means of a series of three interconnected components. In FIG. 11 and FIG. 13, these interconnected components are shown to be (a) two cylindrical connectors 77, (b) two double-aperture plates 74, and (c) left and right hub sockets 79. FIG. 11, FIG. 13, and FIG. 14, each show that two cylindrical connectors 77 are welded 10 to the interior channel 72(*a*) existing at each end of the lower L-beam 72.

FIG. 13 illustrates the inner surface of the left rolling wheel 75 of the rolling attachment 70, including its integral hub, or rim 75(*a*). It is to be noted that a connector 77 of the rolling attachment 70 is shown welded 10 to the interior channel 72(*a*) of the lower L-beam 72. Further, the upper L-beam 71 and lower L-beam 72 are shown welded 10 together. FIG. 14 is a cross-sectional view with respect to section line B-B of FIG. 13, and specifically shows the orientation of the lower L-beam 72 and upper L-beam 71 when the rolling attachment 70 is not attached to the load plate 19 of the electric mover 1.

FIG. 11 shows that the two cylindrical connectors 77 are further joined by a bolt and coupling nut 73, through an aperture (not in view), at the first end 74(*a*) each of two double-aperture plates 74, which first end 74(*a*) extends to connect to the interior of the hubs 75(*a*), 76(*a*) of the rolling wheels 75, 76. The second end 74(*b*) of the double-aperture plate 74 is joined by a similar bolt-type fastener to one end of each of the connectors 77. In this manner, the left and right double aperture plates 74 rotate together, in identical arcs, enabling a user to position of the gap 78 between the conjoined upper L-beam 71 and lower L-beam 72 proximate the load plate 19.

FIG. 14 shows a cross-sectional view of the upper L-beam 72, and lower L-beam 71 of the rolling attachment 70, as seen from the perspective of section line B-B of FIG. 13. The position of the weld 10 joining the connector 77 to the lower L-beam 72, is displayed in FIG. 14. Also shown is the configuration of the coupling bolt 73 joining the center of the hub socket 79 to the left rolling wheel 75. This same arrangement also joins a hub socket 79 to the right rolling wheel 76.

Viewed mutually, FIG. 14 and FIG. 11 illustrate that the two L-beams, 71, 72, are connected in parallel by a weld 10 at each of their respective left ends and right ends. These welds 10 are fabricated so as to leave an evenly-spaced longitudinal gap 78 extending along the length of both L-beams 71, 72. This gap 78 is visible in FIG. 11, FIG. 13, and FIG. 14. When a user places the rolling attachment 70 into operational use, the rolling attachment 70, as shown in FIG. 14, must be rotated clockwise 70(*a*) approximately 120 degrees, which then places the upper L-beam 71, and its exposed channel 71(*a*), vertically above the lower L-beam 72. This positioning enables a user to position the gap 78 over the entirety of the load plate 19 of the electric mover 1. The result of this rotation and placement is the working configuration shown in FIG. 12.

The operational configuration of the rolling attachment 70, as shown in FIG. 12, provides the electric mover 1 with more stability in its forward motion when the left and right main drive wheels 50, 51 are being electrically powered or manually pushed. The rolling attachment 70 serves as additional frontal load support in situations where excessively heavy item(s) are placed upon the load plate 19 of the electric mover 1.

FIG. 14 presents further clarification of the structure of the rolling attachment 70, showing the inner surface of the left rolling wheel 75 and left rim 75(*a*). The orientation of a first weld 10 segment connecting the lower L-beam 72 to the connector 77, and a second weld 10 segment connecting the outer surface of the upper L-beam 71 to the outer surface of the lower L-beam 72 are shown. The arrangement of the longitudinal gap 78 created by the separation of the lower and upper L-beams 72, 71 is shown prior to a user rotating both double aperture plates 74 to facilitate placement upon the load plate 19.

While preferred embodiments of the present inventive method have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, as described by the scope of the claims presented herein.

What is claimed is:

1. A combination manual hand truck and electric mover, comprising:

(a) a main frame, further comprising (i) a handlebar; (ii) a right vertical rail; (iii) a left vertical rail; (iv) a center load brace bar; (v) an upper load brace bar; (vi) a lower load brace bar; (vii) a bottom brace bar; (vii) an upper right load stabilizer; (viii) an upper left load stabilizer; (ix) a lower right load stabilizer; (x) a lower left load stabilizer; (xi) a bottom load brace bar; (xii) a lower protection plate; and (xiii) a multi-use load plate;

(b) a lower support structure, further comprising (i) a right angled strut attached at its upper end to the right vertical rail and attached at its lower end, at an acute angle, to a right brace, the right brace orthogonally connected to the right vertical rail;

(ii) a left angled strut attached at its upper end to the left vertical rail and attached at is lower end, at an acute angle, to a left brace, the left brace orthogonally connected to the left vertical rail;

(iii) a horizontal leverage bar connected at its right end to the junction of the right angled strut and right brace and connected at its left end to the junction of the left angled strut and the left brace; wherein (iv) the inner surface of the left brace and the inner surface of the right brace are each constructed with a bolted mounting device for securing the transaxle left drive shaft and transaxle right drive shaft, respectively, to the electric mover;

(c) a transaxle, co-axially connected to two main drive wheels;

(d) a retractable securing strap;

(e) two replaceable batteries having adequate wiring routed to operate the transaxle;

(f) left and right thumb throttles;

(g) a positionable leg assembly joined to the main frame;

(h) a detachable fork extensions assembly; and (i) a removable rolling attachment.

2. The combination manual hand truck and electric mover of claim 1, wherein the positionable leg assembly further comprises:

(a) a right moveable leg (i) rotatingly attached, at its topmost end to the right vertical rail, (ii) having a right U-brace with a centered hole attached proximate its topmost end, and (iii) having a caster wheel attached to its bottommost end;

(b) an angle iron having a centered orifice, the angle iron being permanently attached to the right vertical rail;

(c) a right locking latch pin insertable into both the right U-brace on the right moveable leg and the centered orifice of the angle iron;

(d) a left moveable leg (i) rotatingly attached, at its topmost end to the left vertical rail, (ii) having a left U-brace with a centered hole attached proximate its topmost end, and (iii) having a caster wheel attached to its bottommost end;

(e) an angle iron having a centered orifice, the angle iron being permanently attached to the left vertical rail;

(f) a left locking latch pin insertable into both the left U-brace on the left moveable leg and the centered orifice of the angle iron;

(g) a cross-leg stabilizer attached to, and connecting, the midpoint of each moveable leg; whereby (h) the positionable leg assembly is (i) placed in an operating configuration by simultaneous insertion of the right and left locking pins through respective right and left U-braces and into the respective right and left angle irons; (ii) the positionable leg assembly is placed in a stowed configuration by removal of both right and left locking latch pins from their right and left angle irons, and allowing both right and left moveable legs to swing downward into positions closer to the right and left vertical rails, respectively.

3. The combination manual hand truck and electric mover of claim 1, wherein the fork extensions assembly further comprises:

(a) an elongated, planar right extension having (i) a right extension tip and (ii) a right pivoting end, the right pivoting end further comprising an integral right tiered hollow-curved bracket;

(b) an elongated planar left extension, having (i) a left extension tip and (ii) a left pivoting end, the left pivoting end further comprising an integral left tiered hollow-curved bracket;

(c) a tubular cylinder having (i) a length equal to the distance between the inner left rail and the inner right rail, (ii) an outer circumference corresponding to the curvature of each hollow-curved bracket, and (iii) an integral L-shaped end brace having a threaded orifice, is permanently affixed at each, the left end and right end of the tubular cylinder;

(d) an encompassing of the exterior surface of the tubular cylinder by each, the circular interior of the hollow-curved bracket of the right extension and the circular interior of the hollow curved bracket of the left extension; whereby (e) each the left and right end braces are bolted, through the threaded orifice and onto the respective left and right vertical rails; enabling movement of the right extension and left extension (i) rotationally downward, parallel to, and in abutment to, the load plate bearing surface, (ii) rotationally upward to stow against the vertical rails of the electric mover; and (iii) individually, laterally along the length of the tubular cylinder.

4. The combination manual hand truck electric mover of claim 1 wherein the rolling attachment further comprises:

(a) two co-axial rolling wheels consisting of (i) a right rolling wheel having right rim, and (ii) a hub socket, and a left rolling wheel having a left rim and a hub socket;

(b) a lower L-beam having a lengthwise inner channel and two outer surfaces, an upper L-beam having a lengthwise inner channel, and two outer surfaces, wherein the outer surfaces of both L-beams are welded together, back-to-back, at their corresponding left and right outer ends, so as to form a linear, lengthwise gap between the outer surfaces of the upper L-beam and the lower L-beam;

(c) said gap having a width dimension corresponding to the thickness of the load plate; and a length equal to the width of the load plate;

(d) a left hub socket connected to and extending from, the left wheel hub, to rotatingly connect to the first end of a double-aperture plate, the double-aperture plate, in turn, rotatingly attached at its second end to a connector, the connector being welded to the left end of the inner channel of the upper L-beam;

(e) a right hub socket connected to and extending from, the right wheel hub, to rotatingly connect to the first end of a double-aperture plate, the double-aperture plate, in turn, rotatingly attached, at its second end, to a connector, the connector being welded to the right end of the inner channel of the upper L-beam; whereby (f) the rolling attachment is placed into operational use by placing the lengthwise gap in abutment to both surfaces of the load plate, thereby providing additional wheeled support to the electric mover.

5. The electric mover of claim 1, wherein the left vertical rail and right vertical rail of the main frame are mutually oriented at a ten-degree angle displacement from perpendicularity to the plane of the bearing surface of the load plate.

6. The electric mover of claim 1, wherein the left and right thumb-throttles are each wired through the interior of the left and right vertical rails of the main frame, into a control box, and to the two battery packs mounted therein, and further wired from the control box to electric terminals on the transaxle.

7. An improvement to a manual hand truck of the type having a generally vertically-oriented main frame, an integral load plate, and two attached wheels, wherein the improvement comprises (a) a main frame, which further comprises (i) a handlebar connected to inclined right and left vertical rails; (ii) an upper right load stabilizer; (iii) an upper left load stabilizer; (iv) a lower right load stabilizer; (v) a lower left load stabilizer; (vi) a bottom load brace bar; (vii) a lower protection plate; and (viii) a multi-use load plate;

(b) a lower support structure; which lower support structure further comprises (i) a right angled strut attached at its upper end to the right vertical rail and attached at its lower end, at an acute angle, to a right brace, the right brace orthogonally connected to the right vertical rail; (ii) a left angled strut attached at its upper end to the left vertical rail and attached at is lower end, at an acute angle, to a left brace, the left brace orthogonally connected to the left vertical rail; (iii) a horizontal leverage bar connected at its right end to the junction of the right angled strut and right brace and connected at its left end to the junction of the left angled strut and the left brace; whereby the inner surface of the left brace and the inner surface of the right brace are each constructed with a bolted mounting device for securing a transaxle left drive shaft and a transaxle right drive shaft, respectively, to the electric mover;

(c) a transaxle, co-axially connected to two main drive wheels;

(d) two replaceable batteries having wiring routed to operate the transaxle;

(e) left and right thumb throttles;

(f) a positionable leg assembly joined to the main frame;

(g) a detachable fork extensions assembly; and (h) a removable rolling attachment.

8. The improvement to the manual hand truck of claim 7, wherein the positionable leg assembly further comprises:

(a) a right moveable leg (i) rotatingly attached, at its topmost end to the right inclined vertical rail, (ii) having a right U-brace with a centered hole attached proximate its topmost end, and (iii) having a caster wheel attached to its bottommost end;

(b) an angle iron having a centered orifice, the angle iron being permanently attached to the right inclined vertical rail;

(c) a right locking latch pin insertable into both the right U-brace on the right moveable leg and the centered orifice of the angle iron;

(d) a left moveable leg (i) rotatingly attached, at its topmost end to the left vertical rail, (ii) having a left U-brace with a centered hole attached proximate its topmost end, and (iii) having a caster wheel attached to its bottommost end;

(e) an angle iron having a centered orifice, the angle iron being permanently attached to the left vertical rail;

(f) a left locking latch pin insertable into both the left U-brace on the left moveable leg and the centered orifice of the angle iron;

(g) a cross-leg stabilizer attached to, and connecting, the midpoint of each moveable leg; whereby (h) the positionable leg assembly is (i) placed in an operating configuration by simultaneous insertion of the right and left locking pins, through respective right and left U-braces and into the respective right and left angle irons; (ii) the positionable leg assembly is placed in a stowed configuration by removal of both right and left locking latch pins from their right and left angle irons, and allowing both right and left moveable legs to swing downward into positions closer to the right and left vertical rails, respectively.

9. The improvement to the manual hand truck of claim 7, wherein the fork extensions assembly further comprises:

(a) an elongated, planar right extension having (i) a right extension tip and (ii) a right pivoting end, the right pivoting end further comprising an integral right tiered hollow-curved bracket;

(b) an elongated planar left extension, having (i) a left extension tip and (ii) a left pivoting end, the left pivoting end further comprising an integral left tiered hollow-curved bracket;

(c) a tubular cylinder having (i) a length equal to the distance between the inner left rail and the inner right rail, (ii) an outer circumference corresponding to the curvature of each hollow-curved bracket, and (iii) an integral L-shaped end brace having a threaded orifice, is permanently affixed at each, the left end and right end of the tubular cylinder;

(d) an encompassing of the exterior surface of the tubular cylinder by each, the circular interior of the hollow-curved bracket of the right extension and the circular interior of the hollow curved bracket of the left extension; whereby (e) each the left and right end braces are bolted, through the threaded orifice and onto the respective left and right vertical rails; enabling movement of the right extension and left extension (i) rotationally downward, parallel to, and in abutment to, the load plate bearing surface, (ii) rotationally upward to stow against the vertical rails of the electric mover; and (iii) individually, laterally along the length of the tubular cylinder.

10. The improvement to the manual hand truck of claim 7, wherein the rolling attachment further comprises:

(a) two co-axial rolling wheels consisting of (i) a right rolling wheel having right rim, and (ii) a hub socket, and a left rolling wheel having a left rim and a hub socket;

(b) a lower L-beam having a lengthwise inner channel and two outer surfaces, an upper L-beam having a lengthwise inner channel, and two outer surfaces, wherein the outer surfaces of both L-beams are welded together, back-to-back, at their corresponding left and right outer ends, so as to form a linear, lengthwise gap between the outer surfaces of the upper L-beam and the lower L-beam;

(c) said gap having a width dimension corresponding to the thickness of the load plate; and a length equal to the width of the load plate;

(d) a left hub socket connected to and extending from, the left wheel hub, to rotatingly connect to the first end of a double-aperture plate, the double-aperture plate, in turn, rotatingly attached at its second end to a connector, the connector being welded to the left end of the inner channel of the upper L-beam; and (e) a right hub socket connected to and extending from, the right wheel hub, to rotatingly connect to the first end of a double-aperture plate, the double-aperture plate, in turn, rotatingly attached, at its second end, to a connector, the connector being welded to the right end of the inner channel of the upper L-beam; whereby (f) the rolling attachment is configured to operate by placement of the lengthwise gap in abutment to both surfaces of the load plate, thereby providing additional wheeled support to the electric mover.

11. The improvement to the manual hand truck of claim 7, wherein the left vertical rail and right vertical rail of the main frame are parallel, and mutually oriented at a ten-degree angle displacement from perpendicularity to the plane of the load plate.

12. The improvement to the manual hand truck of claim 7, wherein the left and right thumb-throttles, are each wired through the interior of the left and right vertical rails of the main frame, and into a control box, and to the two battery packs mounted therein, and further wired from the control box to electric terminals on the transaxle.

* * * * *